US009583010B1

(12) United States Patent
Kolek et al.

(10) Patent No.: US 9,583,010 B1
(45) Date of Patent: Feb. 28, 2017

(54) VERTICAL PATH PROFILE GENERATING SYSTEM, DEVICE, AND METHOD

(71) Applicant: Rockwell Collins, Inc., Cedar Rapids, IA (US)

(72) Inventors: Kirk A. Kolek, Marion, IA (US); Norm W. Arons, Cedar Rapids, IA (US); Mark W. Volner, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 236 days.

(21) Appl. No.: 14/496,543

(22) Filed: Sep. 25, 2014

(51) Int. Cl.
*G01C 23/00* (2006.01)
*G08G 5/00* (2006.01)
*B64D 45/00* (2006.01)

(52) U.S. Cl.
CPC .......... *G08G 5/0065* (2013.01); *B64D 45/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,892,462 A * | 4/1999 | Tran | ............... | G01C 5/005 340/961 |
| 5,978,715 A * | 11/1999 | Briffe | ............... | G05D 1/0808 244/1 R |
| 6,038,498 A * | 3/2000 | Briffe | ............... | G01C 23/00 244/1 R |
| 6,112,141 A * | 8/2000 | Briffe | ............... | G01C 23/00 345/1.3 |
| 8,193,948 B1 * | 6/2012 | Shapiro | ............... | G08G 5/065 340/945 |
| 8,234,058 B1 * | 7/2012 | Barber | ............... | G01C 23/00 701/120 |
| 9,193,442 B1 * | 11/2015 | Young | ............... | B64C 19/00 |
| 2007/0260364 A1 * | 11/2007 | Dwyer | ............... | G01C 23/00 701/3 |
| 2014/0039734 A1 * | 2/2014 | Ramaiah | ............... | G01W 1/02 701/14 |
| 2015/0019047 A1 * | 1/2015 | Chandrashekarappa | | B64D 43/00 701/3 |

OTHER PUBLICATIONS

Climb Requirements. Flight Learnings, 2011 [retrieved on Jun. 10, 2014]. Retrieved from the Internet: <URL: http://www.flightlearnings.com/2011/04/23/climb-requirements/>.

* cited by examiner

*Primary Examiner* — Yonel Beaulieu
(74) *Attorney, Agent, or Firm* — Daniel M. Barbieri; Donna P. Suchy; Angel N. Gerdzhikov (57) ABSTRACT

Present novel and non-trivial system, device, and method for generating a vertical path profile are disclosed. The vertical path profile generating system is comprised of a source of navigation data, a source of performance factors data, a vertical path generator ("VPG") and a presentation system. The VPG may be configured to receive the navigation data representative of takeoff runway information; receive the performance data may be representative of aircraft performance factors; determine a first vertical path and/or second vertical path as a function of criteria employing the navigation data and the performance data; generate presentation data responsive to the determination; and provide the presentation data to one or more presentation devices comprised of, in part, a visual display unit configured to display a first takeoff path profile and/or a second takeoff path profile.

16 Claims, 6 Drawing Sheets

VERTICAL PATH PROFILE GENERATING SYSTEM, DEVICE, AND METHOD

BACKGROUND OF THE INVENTION

Field of the Invention

This invention pertains generally to the field of aircraft display units that present information to the pilot of an aircraft.

Description of the Related Art

Aviation governing authorities such as the Federal Aviation Administration ("FAA") of the Unites States have developed constraints on aircraft climb performance. In the United States, the FAA has published these constraints in Part 25 of the Federal Aviation Regulations. Constraints on aircraft climb performance include minimum climb gradients with one or more engines inoperative during a plurality of take-off ("T/O") segments along with defined aircraft configurations corresponding to the T/O: a ground roll segment, a first segment defining first climb performance criteria, a second segment defining second climb performance criteria, a third segment defining acceleration criteria, and a fourth segment defining third climb performance criteria.

The FAA defines minimum climb gradients in terms of percentages. Although minimum climb gradients are specified as percentages by regulation, pilots often use rates of climb (e.g., feet per minute) or climbs speeds. Manufacturers of aircraft translate minimum climb gradients into tables showing T/O distances as functions of aircraft performance factors such as, for example, temperature, altitude, and weight. By knowing the current temperature at the airport, altitude of the airport, and weight of the aircraft, a pilot may look up various T/O distances during his or her preflight duties and determine whether the aircraft is safe for T/O. Although these duties are routine, mistakes could be made by the pilot.

BRIEF SUMMARY OF THE INVENTION

The embodiments disclosed herein present novel and non-trivial system, device, and method for generating a vertical path profile that is presentable to a pilot. The vertical path profile could be used to enhance situational awareness of a pilot by informing him or her whether takeoff or climb limitations exist for one or more segments of a takeoff path.

In one aspect, embodiments of the inventive concepts disclosed herein are directed to a system for generating a vertical path profile. The system may include a source of navigation data, a source of performance data, a vertical path generator ("VPG"), and a presentation system. In some embodiments, the presentation system may include a visual display unit, an aural advisory unit, and/or a tactile advisory unit.

In another aspect, embodiments of the inventive concepts disclosed herein are directed to a device for generating a vertical path profile. The device may include the VPG and may be configured (or programmed) to perform a method of generating a vertical path profile presentable to a viewer.

In a further aspect, embodiments of the inventive concepts disclosed herein are directed to a method for generating a vertical path profile. When properly configured, the VPG may retrieve navigation data, receive performance data, determine a first vertical path as a function of first design criteria, and generate presentation data responsive to the determination. The navigation data may be representative of takeoff runway information, and the performance data may be representative of aircraft performance factors, where the first design criteria could employ both the takeoff runway information and the aircraft performance factors in the determination of the first vertical path. The VPG may further determine a second vertical path as a function of second design criteria employing the navigation data and the aircraft performance data. The VPG may be further configured to provide the presentation data to the presentation system for a subsequent presentation of visual, aural, and/or tactile information and/or stimuli from which the pilot may be informed and made aware of the situation of the aircraft for takeoff and climb.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
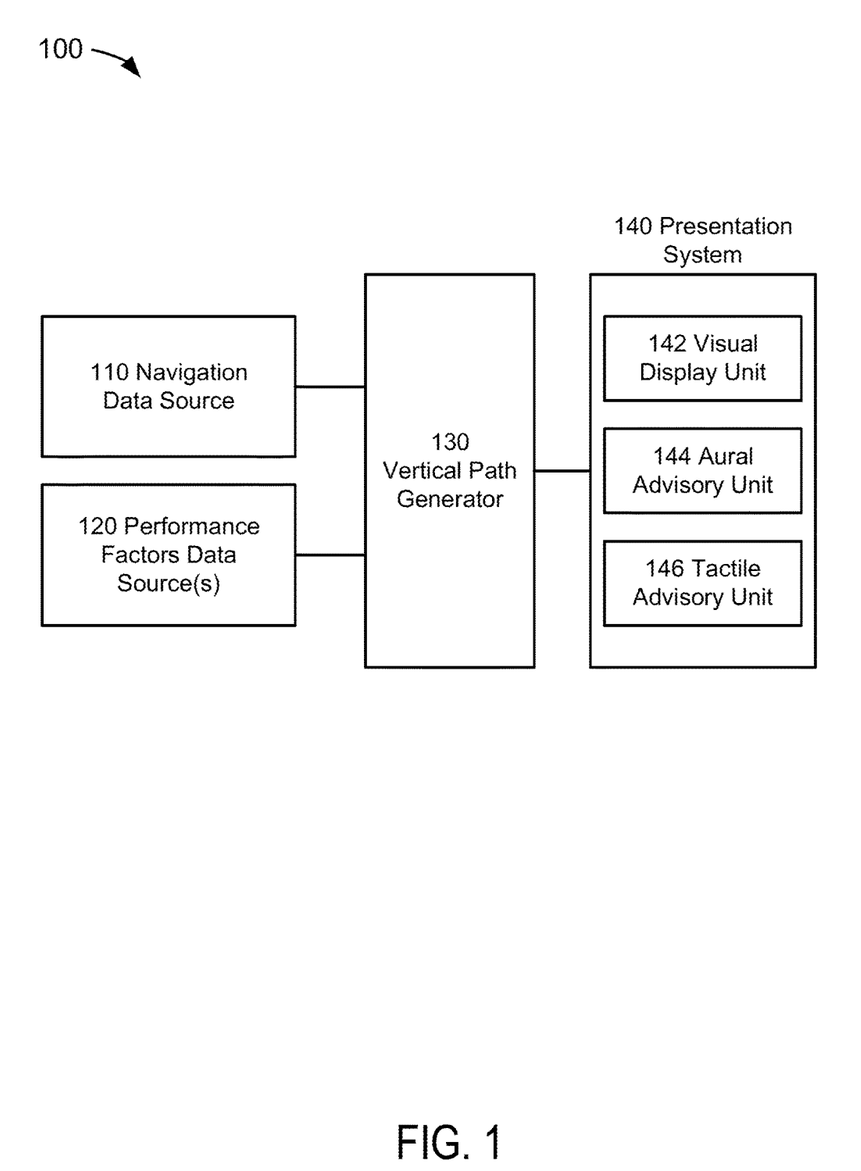
FIG. 1 depicts a functional block diagram of an embodiment of a system for generating a vertical path profile.

FIG. 1 depicts a functional block diagram of an embodiment of a vertical path profile generating system 100 suitable for implementation of the techniques described herein. The functional blocks of the system 100 include a navigation data source 110, a performance factors data source 120, a vertical path generator ("VPG") 130, and a presentation system 140.

The navigation data source 110 could include any source(s) which provides navigation data information in an aircraft. The navigation data source 110 may include, but is not limited to, an air/data system, an attitude heading reference system, an inertial guidance system (or inertial reference system), and a global navigation satellite system (or satellite navigation system), all of which are known to those skilled in the art. The navigation data source 110 could provide navigation data including, but not limited to, geographic position, altitude, heading, attitude, ground speed, air speed, and/or time. Aircraft position may be comprised of geographic position (e.g., latitude and longitude coordinates) and altitude, and ground track may be derived from either geographic position, aircraft position, or both. Aircraft orientation may be comprised of pitch, roll, and/or yaw information related to the attitude of the aircraft.

The navigation data source 110 could further include a flight management system ("FMS") which could perform a variety of functions to help the crew in the management of the flight. These functions could include receiving a flight plan (i.e., planned trajectory) and constructing a lateral and vertical flight plan (i.e., planned lateral and vertical trajectories) from the flight plan. The flight plan could be comprised of a series of waypoints, where each waypoint could include an altitude constraint associated with it. A pilot could create a flight plan by entering waypoints stored in a database or select a flight plan stored in a database of the FMS. In some embodiments, the flight plan could be received and loaded into the FMS automatically through a data link system.

In the performance of its many functions, the FMS could compute a variety of distances and/or surface lengths. Further, distances and/or lengths could be computed by the pilot and entered into the FMS in some embodiments. The FMS may perform a variety of functions to help the crew in the management of the flight. In the performance of its many functions, the FMS may receive navigation data from the navigation data source 110 such as those discussed above.

It should be noted that, in some embodiments for any source or system in an aircraft including the navigation data source 110, data could be comprised of any analog or digital signal, either discrete or continuous, which could contain information or be indicative of information. In some embodiments, aircraft could mean any vehicle which is able to fly through the air or atmosphere including, but not limited to, lighter than air vehicles and heavier than air vehicles, wherein the latter may include manned or unmanned fixed-wing and rotary-wing vehicles.

Typically, an FMS is comprised of a navigation database that stores data associated with a flight plan such as, but not limited to, published instrument approach procedures, ground-based navigational aids, waypoints, holding patterns, airways, airports, heliports, instrument departure procedures, instrument arrival procedures, runways, precision approach aids, company routes, airport communications, localizer and airway markers, special use airspace, airport sector altitudes, enroute airways restrictions, enroute communications, preferred routes, controlled airspace, geographical references, arrival and/or departure flight planning, path point records, and global navigation satellite system landing systems. With respect to runway data, non-exhaustive list of runway information such as the location and elevation of a runway's landing threshold point, runway length, and runway width may be stored. The navigation database employed by the FMS could be a database described in the following document published by Aeronautical Radio, Incorporated ("ARINC"): ARINC Specification 424 entitled "Navigations Systems Data Base" ("ARINC 424"), an aviation industry standard known to those skilled in the art and which is incorporated by reference herein in its entirety. Those skilled in the art appreciate that aviation standards may be changed with future amendments or revisions, that additional content may be incorporated in future revisions, and/or that other standards related to the subject matter may be adopted. The embodiments disclosed herein are applicable to such future aviation standards changes and/or adoptions.

The performance factors source 120 could be comprised of any source or combination of sources that could provide aircraft performance factors which may be employed to define aircraft performance and determine a plurality of vertical paths and/or vertical path profiles as discussed herein. For example, the performance factors source 120 could be comprised of one or more aircraft systems or components thereof. The performance factors source 120 could include real-time system or sensor data, signal input from a plurality of aircraft systems or sensors, and information from any database or source. Detailed discussions of the aircraft performance factors and the employment thereof have been disclosed (and discussed as input factors) by Wichgers et al in U.S. Pat. No. 8,234,020 entitled "System and Methods for Generating Alert Signals in a Terrain Awareness Warning System" and by Young et al in U.S. Pat. No. 8,234,068 entitled "System, Module, and Method for Constructing a Flight Path used by an Avionics System," both of which are incorporated herein by reference in their entirety. In some embodiments, the performance factors source 120 could be configured to provide aircraft performance factors data to the VPG 130 for subsequent processing as discussed herein.

The VPG 130 may be comprised of any electronic data processing unit which executes software or computer instruction code that could be stored, permanently or temporarily, in a digital memory storage device or a non-transitory computer-readable media including, but not limited to, random access memory (RAM), read-only memory (ROM), compact disc (CD), hard disk drive, diskette, solid-state memory, Personal Computer Memory Card International Association card (PCMCIA card), secure digital cards, and compact flash cards. The VPG 130 may be driven by the execution of software or computer instruction code containing algorithms developed for the specific functions embodied herein. The VPG 130 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the VPG 130 could also consist of more than one electronic data processing unit. In some embodiments, the VPG 130 could be a processor(s) used by or in conjunction with any other system of the aircraft including, but not limited to, the navigation data source 110, the performance factors source 120, and the presentation system 140.

In some embodiments, the terms "programmed" and "configured" are synonymous. The VPG 130 may be electronically coupled to systems and/or sources to facilitate the receipt of input data. In some embodiments, operatively coupled may be considered as interchangeable with electronically coupled. It is not necessary that a direct connection be made; instead, such receipt of input data and the providing of output data could be provided through a data bus, through a wireless network, or as a signal received and/or transmitted by the VPG 130 via a physical or a virtual computer port. The VPG 130 may be programmed or configured to execute the method discussed in detail below. The VPG 130 may be programmed or configured to provide output data to various systems and/or units including, but not limited to, the presentation system 140.

The presentation system 140 could be comprised of any unit of which visual, aural, and/or tactile indications may be presented to the pilot including, but not limited to, a visual display unit(s) 142, an aural advisory unit 144, and/or a tactile advisory unit 146. The visual display unit 142 could be comprised of any unit of which information may be presented visually to the pilot. The visual display unit 142 could be part of an Electronic Flight Information System ("EFIS") and could be comprised of, but is not limited to, a Primary Flight Display ("PFD"), Navigation Display ("ND"), Head-Up Display ("HUD"), Head-Down Display ("HDD"), Multi-Purpose Control Display Unit, Engine Indicating and Crew Alerting System, Electronic Centralized Aircraft Monitor, Multi-Function Display, Side Displays, Electronic Flight Bags, Portable Electronic Devices (e.g., laptops, smartphones, tablets, and/or user-wearable devices such as head mounted devices).

The visual display unit 142 could be capable of projecting and/or presenting a vertical path profile(s) together with a horizontal axis and a vertical axis as disclosed below. In addition, visual advisories may be presented graphically and/or textually with each attainable T/O path profile segment as disclosed below. Generally, advisory information may include alerts and/or non-alert(s). Alerts may be based on level of threat or conditions requiring immediate crew awareness or attention. Caution alerts may be alerts requiring immediate crew awareness in which subsequent corrective action will normally be necessary. Warning alerts may be alerts requiring immediate crew action. In some embodiments, both caution and warning alerts may be presented in combination with or simultaneous to aural advisories and/or tactile advisories. Non-alerts may be any other information not requiring immediate crew attention or awareness. Alerts may be presented visually by depicting one or more colors and may be presented on a display unit indicating one or more levels of threat. For the purpose of illustration and not limitation, amber or yellow may indicate a caution alert, red may indicate a warning alert, and green or cyan may indicate a non-alert.

The aural advisory unit 144 may be any unit capable of producing aural advisories. Aural advisories may be discrete sounds, tones, and/or verbal statements used to annunciate a condition, situation, or event. Examples of aural advisories are provided below. In some embodiments, both aural advisories could be presented in combination with or simultaneous to visual alerts and/or tactile advisories.

The tactile advisory unit 146 may be any unit capable of producing tactile advisories. Tactile advisories may be any tactile stimulus to present a condition, situation, or event to the pilot such as, but not limited to, a warning alert and/or a caution alert. Examples of tactile stimuli include a "stick shaker" and a vibrating seat (e.g., a pilot's seat outfitted with a vibrating device). Moreover, tactile advisories could be presented in combination with or simultaneous to visual alerts and/or aural advisories. In some embodiments, one or more units of the presentation system 140 may receive presentation data provided by VPG 130.

Figure 2A:
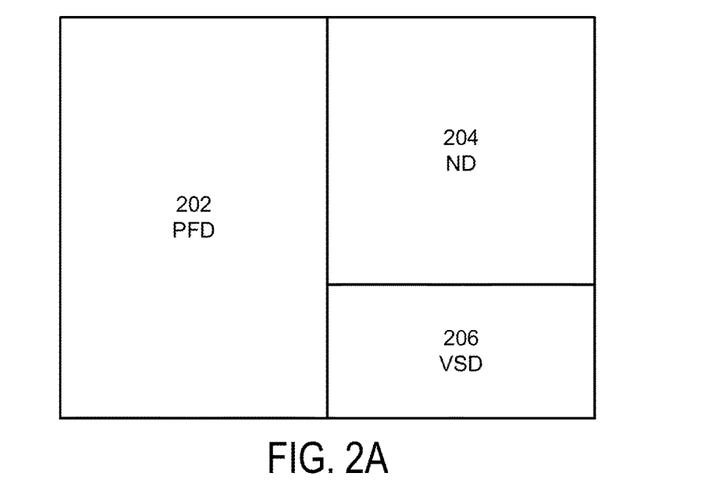
FIG. 2A illustrates a display unit configured to present three images on the screen of a display unit.

The visual display unit 142 may be configured to present one or more display(s) or image(s). In some embodiments, the terms "display" and "image" are interchangeable and treated synonymously. Referring now to FIG. 2A, a visual display unit 142 has been configured to present three images of displays on the screen of the visual display unit 142: the tactical display comprised of a PFD 202, the strategic display comprised of an ND 204, and a strategic display comprised of a vertical situation display ("VSD") 206.

Figure 2B:
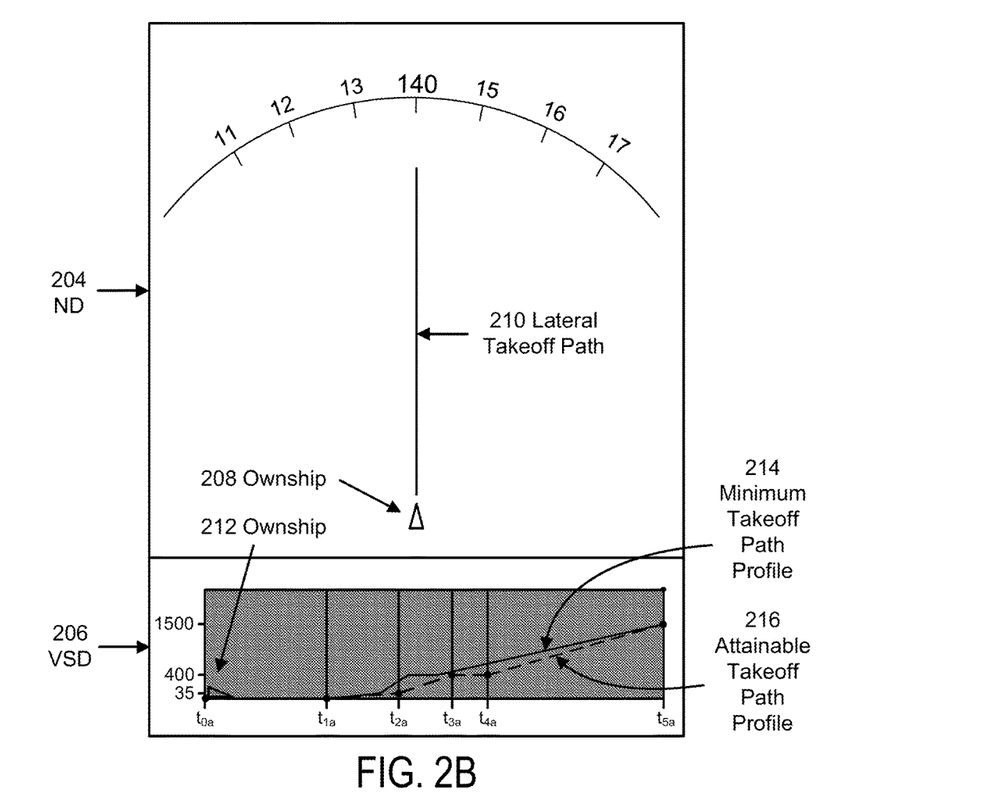
FIG. 2B illustrates symbologies depicted by images of a navigation display and a vertical situation display.

For the purpose of illustration and not of limitation, FIG. 2B illustrates symbologies that are depicted by the ND 204 and the VSD 206 that could be presented on display unit of FIG. 2A. The symbols depicted by the ND 204 include triangular shaped symbology of ownship 208 and a lateral takeoff path 210. The symbols depicted by the VSD 206 include triangular shaped symbology of ownship 212, a minimum takeoff path profile 214, and an attainable takeoff path profile 216. A vertical axis representative of vertical distance scale is shown on the left side of the VSD 206, and a horizontal axis that could be representative of a time scale and/or a distance scale (a time scale is shown) is shown near the bottom. It should be noted that the symbology shown in FIG. 2B has been made minimal intentionally for the sake of presentation and is not indicative of the plurality of indications or information with which it may be configured manufacturer and/or end-user.

Figure 3:
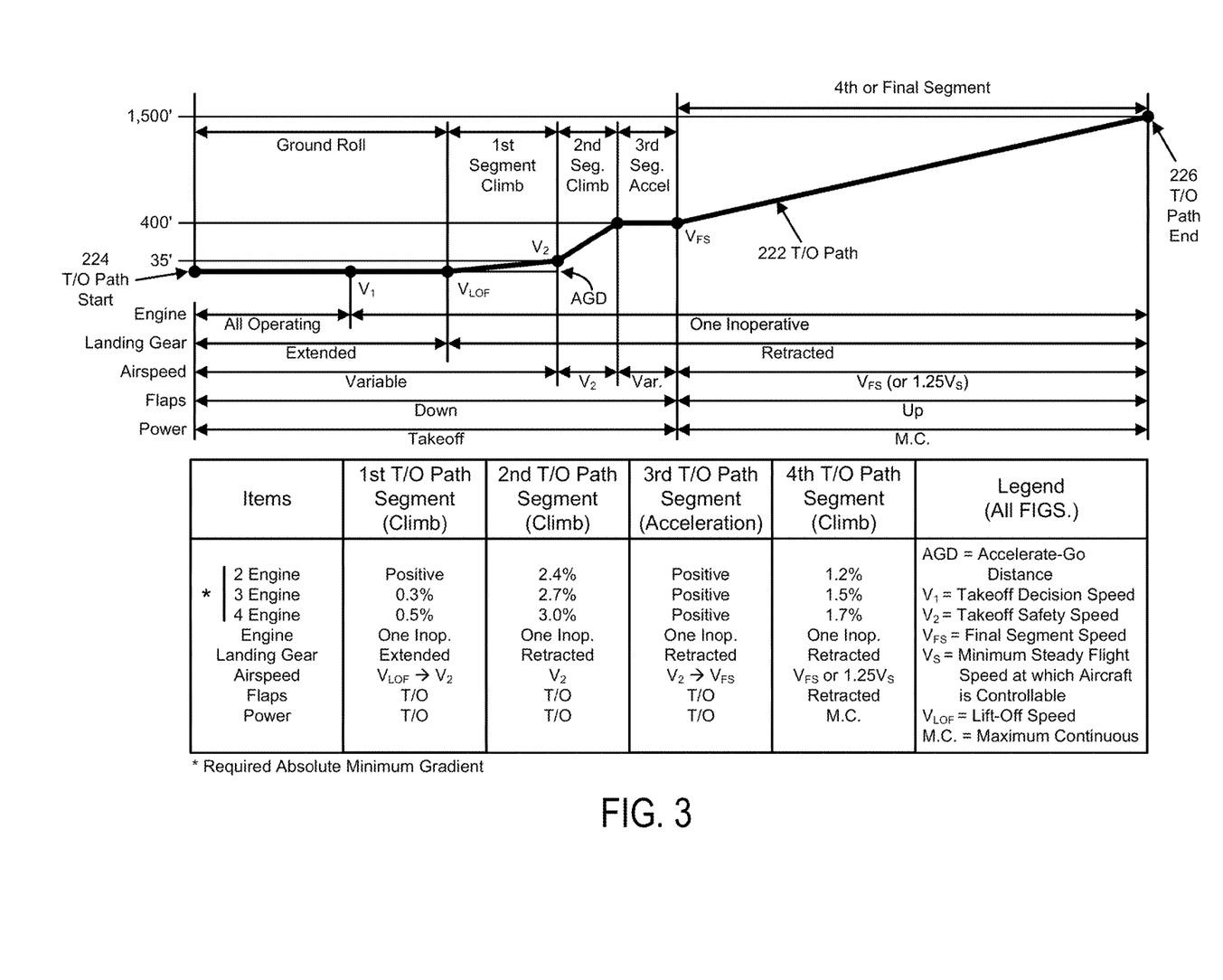
FIG. 3 illustrates a climb requirements chart of a takeoff ("T/O") path.

Referring to FIG. 3, a climb requirements chart of a takeoff ("T/O") path that may be used to illustrate regulatory performance requirements (i.e., regulations) established by an aviation governing authority (i.e., an aviation regulatory authority) to certify an aircraft under the "transport category" category of aircraft; the climb requirements chart of FIG. 3 modifies a chart published by flightlearnings.com at the time of this writing. The climb requirements illustrated in FIG. 3 graphically depict requirements defined by the FAA. Although the discussion that follows will be drawn to regulatory standards adopted by the FAA, those skilled in the art appreciate that aviation regulations may be changed with future amendments or revisions or that different governing authorities may establish different regulations. The embodiments disclosed herein are flexible enough to include such future amendments or revisions or different regulations.

Referring to FIG. 3, a T/O path 222 is depicted by a thick line in between the T/O path start 224 and T/O path end 226. The T/O path 222 is comprised of a plurality of segments including a ground roll segment and a plurality of flight segments. The length of the ground roll segment may be defined as the distance required for an aircraft to accelerate from a stop to a lift-off speed VLOF (each of the "V speeds" shown in the FIGS. are shown with subscripts). It is assumed that all engines operate at takeoff power in between the T/O path start 224 and takeoff decision speed V1 (or VEF, a pre-defined speed at which a critical engine is assumed to fail), an engine failure is experienced, and the remaining engine(s) are used to continue with the takeoff. Those skilled in the art understand that aircraft performance factors such as, but not limited to, pressure altitude, temperature, headwind component of a wind, runway gradient or slope, and/or aircraft weight may have an effect on the required distance for the ground roll as well as attainable climb gradients and acceleration of the plurality of flight segments.

The plurality of flight segments may be comprised of climb and acceleration segments. The first segment could be comprised of a climb segment in which the aircraft becomes airborne (at VLOF) until it reaches a height of 35 feet and accelerates from VLOF to a takeoff safety speed V2. Depending on the engine configuration, a predefined, numerical minimum climb gradient may have to be met as shown in the table of FIG. 3. Segment configurations for landing gear, flaps, and engine power for the first segment are also shown. A required runway distance known to those skilled in the art as an "accelerate-go distance" ("AGD")

may be the distance required for the aircraft to reach to the 35 feet height at V2 from the T/O path start 224.

The second segment could be comprised of a climb segment in which the aircraft may be expected to climb at a steady V2 in between the height of 35 feet and a height of 400 feet. Predefined, numerical minimum climb gradients for the second segment are shown in the table along with segment configurations for landing gear, flaps, and engine power.

The third segment could be comprised of an acceleration segment in which the aircraft may be expected to accelerate from V2 to a final segment speed VFS (or 1.25 times a minimum steady flight speed at which the aircraft is controllable VS). Segment configurations for landing gear, flaps, and engine power for the third segment are shown in the table.

The fourth segment could be comprised of a climb segment in which the aircraft may be expected to climb at a steady VFS in between the height of 400 feet and a height of 1,500 feet. Predefined, numerical minimum climb gradients for the fourth segment are shown in the table along with segment configurations for landing gear, flaps, and engine power.

Figure 4A:
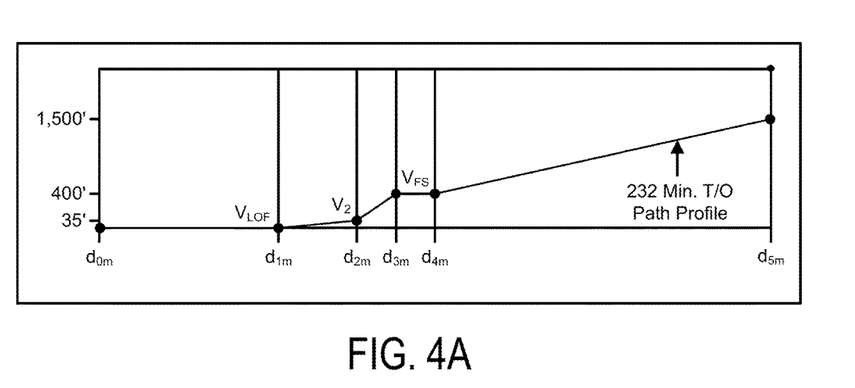
FIG. 4A illustrates a minimum T/O path profile.

Some advantages and benefits of embodiments discussed herein are shown in FIGS. 4A-4F by illustrating how climb requirements may be used to generate a second profile and enhance situational awareness by informing the pilot of whether there exists takeoff or climb limitations of one or more segments of a takeoff path. Referring to FIG. 4A, a minimum T/O path profile 232 is shown along with horizontal and vertical axes. As shown, the horizontal axis is comprised of a distanced-based scale, and the vertical axis is comprised of a vertical distance scale. Although the discussion that follows will be drawn to a horizontal axis comprised of a distance-based scale, embodiments disclosed herein are not exclusive to the distance-based scale but could include other scales such as, but no limited to, a time-based scale.

Distance d0m could be an initial point on the takeoff surface (e.g., beginning of a T/O runway) at which the aircraft starts the T/O path. Alternatively, distance d0m could be the initial point from which the aircraft starts the T/O path so that it places the AGD at the end of an available T/O surface (e.g., the end of a T/O runway). Applying existing or real-time aircraft performance factors and the segment conditions for landing gear, flaps, and engine power shown in the table of FIG. 3 to aircraft performance algorithm(s), distances may be determined or estimated. Distance d1m could be the estimated distance at which the aircraft reaches VLOF, and distance d2m could be an estimated time (total distance measured from d0m or a segment distance measured from dim) at which the aircraft reaches a height of 35 feet while accelerating from VLOF to V2 at a minimum, predefined climb gradient for the segment (i.e., segment climb gradient) applicable to the engine configuration of the aircraft.

Distance d3m could be the estimated total or segment distance at which the aircraft climbs to a height of 400 feet at a minimum, predefined segment climb gradient. Distance d4m could be the estimated total or segment distance at which the aircraft accelerates from V2 to VFS. Distance d5m could be the estimated total or segment distance at which the aircraft climbs to a height of 1,500 feet a minimum, predefined segment climb gradient at VFS.

Figure 4B:
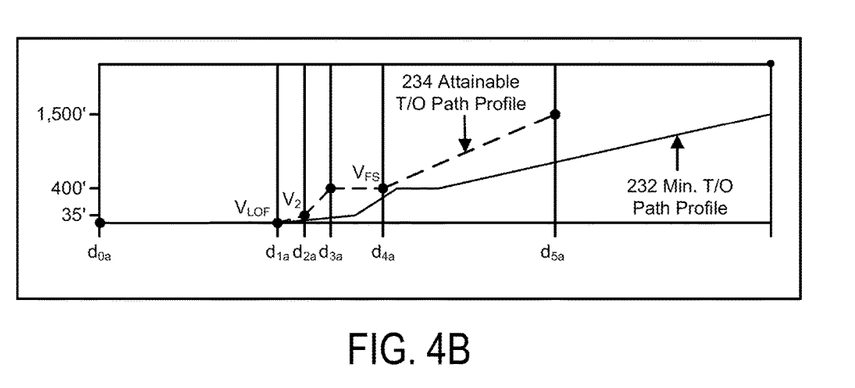
FIG. 4B illustrates an attainable T/O path profile.

Referring to FIG. 4B, an attainable T/O path profile 234 is shown. Distance d0a could be an initial point on the takeoff surface (e.g., beginning of a T/O runway) at which the aircraft starts the T/O path. Applying existing or real-time aircraft performance factors and the segment conditions (or aircraft configuration) for landing gear, flaps, and engine power shown in the table of FIG. 3 to aircraft performance algorithm(s), distances may be determined or estimated. Distance d1a could be the estimated distance at which the aircraft reaches VLOF, and distance d2a could be an estimated total or segment distance at which the aircraft reaches a height of 35 feet while accelerating from VLOF to V2 at a climb gradient attainable by the aircraft (e.g., maximum climb gradient).

Distance d3a could be the estimated total or segment distance at which the aircraft climbs to a height of 400 feet at an attainable climb gradient while maintaining V2. Distance d4m could be the estimated total or segment distance at which the aircraft accelerates from V2 to VFS. Distance d5m could be the estimated total or segment distance at which the aircraft climbs to a height of 1,500 feet at an attainable climb gradient while maintaining VFS.

Figure 4C:
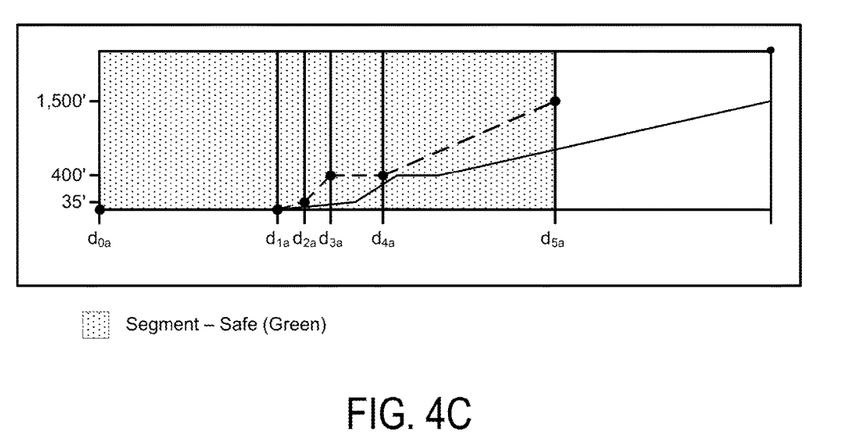
FIG. 4C illustrates both a minimum T/O path profile and an attainable T/O path profile.

Referring to FIG. 4C, the minimum T/O path profile of FIG. 4A (solid line) is shown with the attainable T/O path profile of FIG. 4B (dashed line). As shown, each of the segments of the attainable T/O path profile is located at or above corresponding segments of the minimum T/O path profile. By observation, each of the attainable climb gradients exceeds the minimum climb gradients. Based upon the graphical presentation of both T/O path profiles, a pilot can easily or readily observe that none of the segments of the T/O path have exceeded takeoff limitations to which the aircraft has been certified.

Additionally, visual advisories may be presented with each attainable T/O path profile segment. Because each segment of the attainable T/O path profile is located at or above a corresponding segment of the minimum T/O path profile, the visual advisory could present a highlighter indicating to the pilot none of the segments have exceeded a limitation. As shown in FIG. 4C, the visual advisory is comprised of zones highlighted in a color (e.g., green) commensurate with the conveyance of a favorable (or safe) T/O path. Alternatively, the visual advisory could display each segment conspicuously with a color commensurate with a favorable condition (i.e., no limitation) instead or along with colored zones; if so, presenting the minimum T/O path profile may be omitted. Also, a text message such as "TAKEOFF PATH SEGMENTS—OK" may be presented to the pilot. Also, the aural advisory unit could present a "TAKEOFF PATH SEGMENTS—OK" announcement.

Figure 4D:
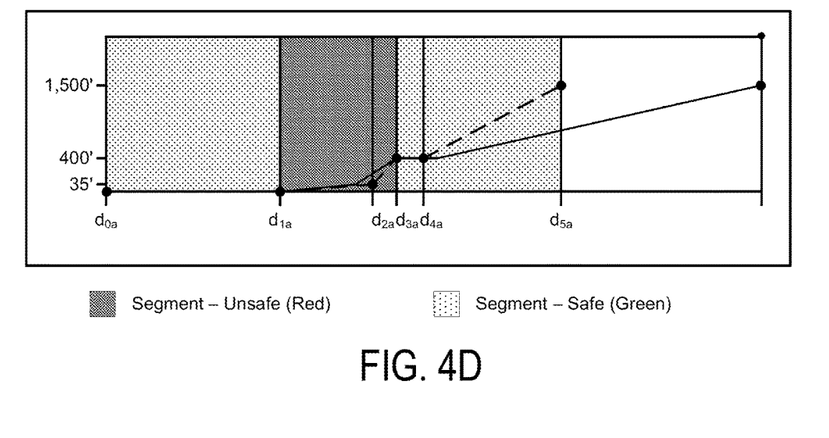
FIG. 4D illustrates a first scenario in which part of an attainable T/O path profile is located below a minimum T/O path profile.
Figure 4E:
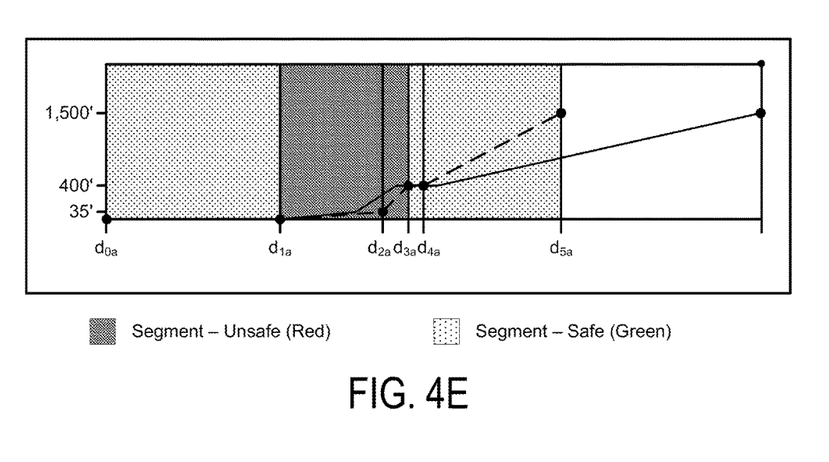
FIG. 4E illustrates a second scenario in which part of an attainable T/O path profile is located below a minimum T/O path profile.

Referring to FIGS. 4D and 4E, part of the attainable T/O path profile is located below the minimum T/O path profile; specifically, the segments of the attainable T/O path profile between d1a and d3a are located below corresponding segments of the minimum T/O path profile (in FIG. 4D, d3a intersects d3m (not shown)). As shown in FIGS. 4D and 4E, the reason why part of the attainable T/O path profile falls below that minimum climb profile is that the attainable climb gradient between d1a and d2a is less than the corresponding minimum climb gradient. Based upon the graphical presentation of both T/O path profiles, a pilot can easily or readily observe that two of the segments of the T/O path have exceeded takeoff limitations to which the aircraft has been certified.

Because two segments of the attainable T/O path profile are located below a corresponding segment of the minimum T/O path profile, the visual advisory could present a highlighter indicating to the pilot that both of these segments have exceeded a limitation. As shown in FIGS. 4D and 4E, the visual advisory is comprised of zones highlighted in a color (e.g., red) commensurate with the conveyance of an unfavorable (or unsafe) T/O path condition(s). Also, the visual advisory could display each unfavorable segment conspicuously with a color commensurate with an unfavorable condition (i.e., the presence of a limitation(s)) instead or along with colored zones; if so, it may presenting the minimum T/O path profile may be omitted. Also, a text message such as "TAKEOFF PATH SEGMENTS—LIMITATIONS EXCEEDED" or "TAKEOFF PATH CLIMB SEGMENTS 1 AND 2—LIMITATIONS EXCEEDED" may be presented to the pilot. Although not shown, the zone and/or segment located to the left (the zone or segment corresponding to the ground run) of d1a could be highlighted.

Figure 4F:
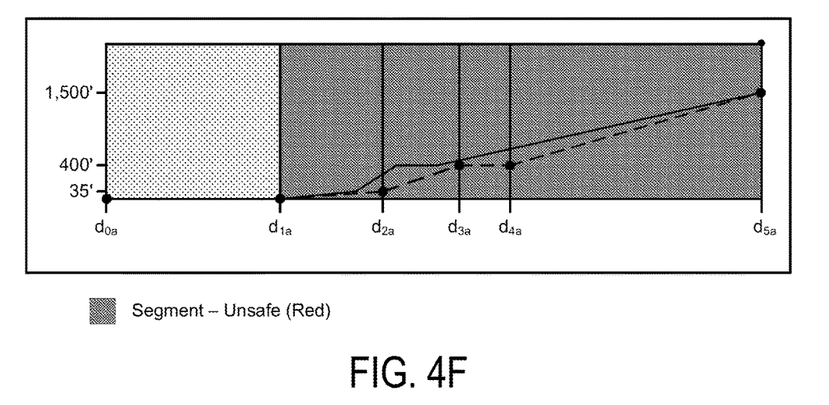
FIG. 4F illustrates a third scenario in which part of an attainable T/O path profile is located below a minimum T/O path profile

Also, the aural advisory unit could present an announcement commensurate with an unfavorable condition such as "TAKEOFF PATH SEGMENTS—LIMITATIONS EXCEEDED" or "TAKEOFF PATH CLIMB SEGMENTS 1 AND 2—LIMITATIONS EXCEEDED" for FIG. 4D. For FIG. 4E, an announcement such as "TAKEOFF PATH SEGMENTS—LIMITATIONS EXCEEDED" or "TAKEOFF PATH CLIMB SEGMENTS 1, 2, and 3—LIMITATIONS EXCEEDED" may be presented. Also, the tactile advisory unit could present a tactile advisory to the pilot Referring to FIG. 4F, most of the attainable T/O path profile is located below the minimum T/O path profile; specifically, the segments of the attainable T/O path profile between d1a and d5a are located below corresponding segments of the minimum T/O path profile. As shown in FIG. 4F, the reason why most of the attainable T/O path profile falls below that minimum climb profile is that the two attainable climb gradients between d1a and d3a and d2a are less than the corresponding two minimum climb gradients. Based upon the graphical presentation of both T/O path profiles, a pilot can easily or readily observe that four of the segments of the T/O path have exceeded takeoff limitations to which the aircraft has been certified.

As shown in FIG. 4F, the visual advisory is comprised of zones highlighted in a color (e.g., red) commensurate with the conveyance of an unfavorable (or unsafe) T/O path condition(s). Alternatively, the visual advisory could display each unfavorable segment conspicuously with a color commensurate with an unfavorable condition (i.e., the presence of a limitation(s)) instead or along with colored zones; if so, presenting the minimum T/O path profile may be omitted. Also, a text message such as "TAKEOFF PATH SEGMENTS—LIMITATIONS EXCEEDED" or "TAKEOFF FLIGHT PATH SEGMENTS 1, 2, 3, and 4—LIMITATIONS EXCEEDED" in red.

Also, the aural advisory unit could present an announcement commensurate with an unfavorable condition such as "TAKEOFF PATH SEGMENTS—LIMITATIONS EXCEEDED" or "TAKEOFF FLIGHT PATH SEGMENTS 1, 2, 3, and 4—LIMITATIONS EXCEEDED". Also, the tactile advisory unit could present a tactile advisory to the pilot.

Although the preceding discussion has been drawn an attainable T/O path resulting from an application of existing or real-time aircraft performance factors along with the segment conditions (or aircraft configuration) shown in the table of FIG. 3 to aircraft performance algorithm(s), an alternate attainable T/O path could be determined. For instance, an attainable T/O path could be comprised of a planned T/O path determined from an aircraft configuration defined by a manufacturer and/or end-user which employs a custom aircraft configuration (e.g., all engines operable, actual rate of climb with all engines operable) for a normal or routine T/O. In such a configuration, the planned T/O path profile could be depicted to the left of the attainable T/O path profiles 234 shown in FIGS. 4B through 4F. With all engines operating, maximum climb gradient may be steeper, resulting is a shifting to the left on the horizontal axis of d1a through d5a, inclusive.

Figure 5:
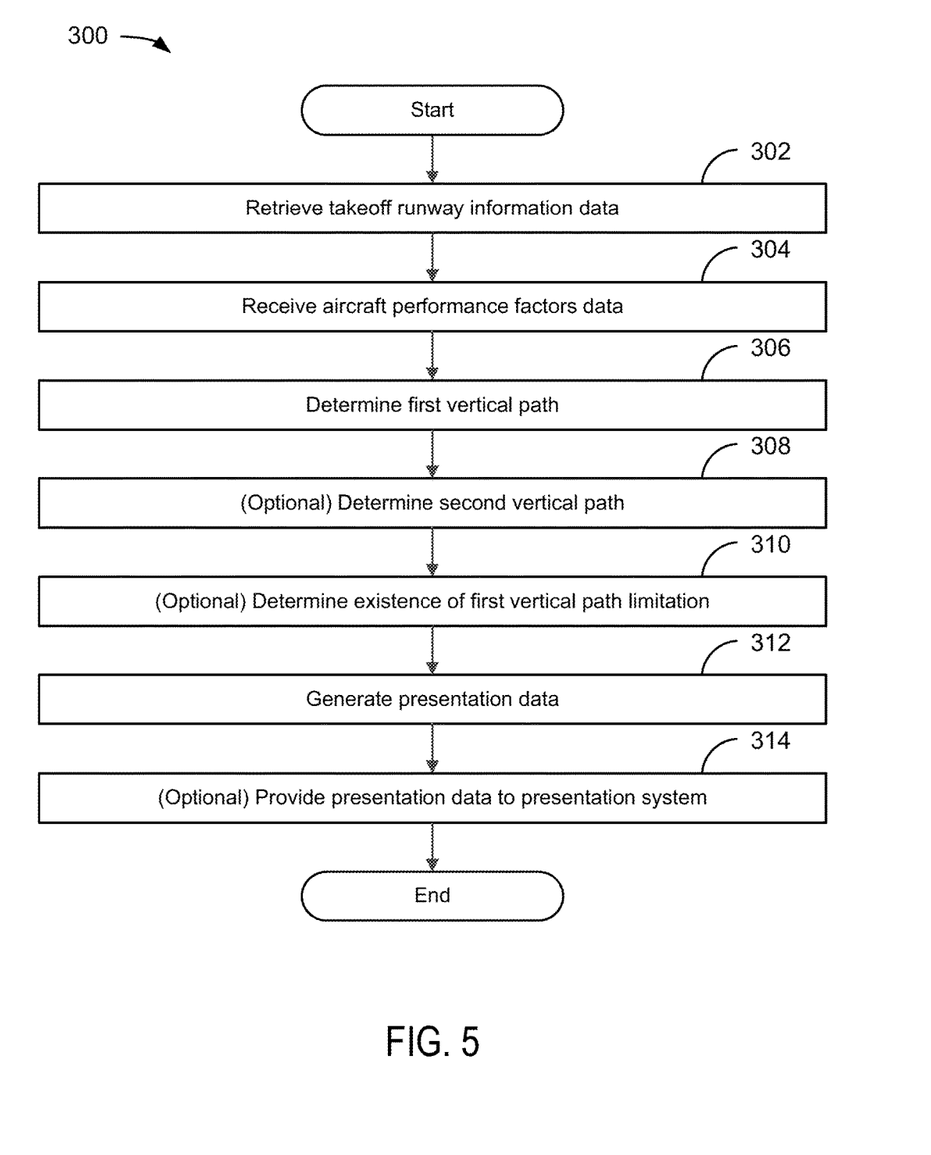
FIG. 5 illustrates a flowchart disclosing an embodiment of a method for generating a T/O path profile.

FIG. 5 depicts flowchart 300 disclosing an example of a method for generating a vertical path profile, where the VPG 130 may be programmed or configured with instructions corresponding to the modules embodied in flowchart 300. In some embodiments, the VPG 130 may be a processor or a combination of processors found in the presentation system 140 or any other system suitable for performing the task. Also, the VPG 130 may be a processor of a module such as, but not limited to, a printed circuit card having one or more input interfaces to facilitate the two-way data communications of the VPG 130, i.e., the receiving and providing of data. As necessary for the accomplishment of the following modules embodied in flowchart 300, the receiving of data is synonymous and/or interchangeable with the retrieving of data, and the providing of data is synonymous and/or interchangeable with the making available or supplying of data.

The method of flowchart 300 begins with module 302 with the VPG 130 retrieving of data representative of takeoff runway information from the navigation data source 110. In some embodiments, the source of takeoff runway information data could be comprised of a FMS.

The flowchart 300 continues with module 304 with the VPG 130 receiving of data representative of aircraft performance factors from the performance factors data source 120. In some embodiments, the source of takeoff runway information data could be comprised of a FMS.

The flowchart 300 continues with module 306 with the VPG 130 determining of a first vertical path. The first vertical path may be comprised of a plurality of first segments determined as a function of first design criteria, where the first design criteria may be comprised of a plurality of attainable climb gradients. Also, the first design criteria may be comprised of a plurality of designated speeds, a plurality of designated vertical distances, and a predefined, inoperative engine configuration. The first vertical path could be a path comprised of a plurality of first segments such as the ground roll, first climb, second climb, acceleration, and third climb segments. In some embodiments, the first vertical path may be a first takeoff path comprised of an attainable T/O path using the configuration stated in Table 3 or an attainable T/O path defined by a manufacturer and/or end-user. The first takeoff path may be comprised of a ground roll segment and a plurality of flight segments.

The flowchart 300 continues with an optional module 308 with the VPG 130 determining of a second vertical path. The second vertical path may be comprised of a plurality of second segments (such as such as the ground roll, first climb, second climb, acceleration, and third climb segments) determined as a function of second design criteria, where the second design criteria may be comprised of a plurality of predefined, climb gradients. Similar to the first design criteria, the second design criteria may also be comprised of a plurality of designated speeds, a plurality of designated vertical distances, and a predefined, inoperative engine configuration. In some embodiments, the second vertical path may be a second takeoff path; similar to the first takeoff path, the second takeoff path may be comprised of a ground roll segment and a plurality of flight segments.

In some embodiments, the second design criteria could be modified so that that AGD is located above an accelerate-stop distance available point of a takeoff runway or stopway (if provided), where the accelerate-stop distance available could be the distance of the length of the runway available for a ground roll plus, if provided, the length of a stopway. The location of the T/O path start 224 and/or the location of VLOF may have to be adjusted in the modified second design criteria so that the AGD is located above an accelerate-stop distance available point.

The flowchart 300 continues with an optional module 310 including the VPG 130 determining of whether one or more first segments subject a limitation upon the first vertical path. As discussed above, vertical path limitations may not exist where the first vertical path (e.g., an attainable T/O path) is located at or above the second vertical path (e.g., a minimum T/O path); in other words, first vertical path limitations may exist where the first vertical path is below the second vertical path.

A comparison of the two vertical profiles may be performed to determine the existence or non-existence of a first vertical path limitation. For example, assume that that first vertical path is comprised of the available T/O path and the second vertical path is comprised of the minimum T/O path that has been discussed above. If d2a is greater than d2m, then the first flight segment has subjected the first vertical path into exceeding a limitation. If d3a is greater than d3m, then the second flight segment has subjected the first vertical path into exceeding a limitation. If d4a is greater than d4m, then the third flight segment has subjected the first vertical path into exceeding a limitation. If d5a is greater than d5m, then the fourth flight segment has subjected the first vertical path into exceeding a limitation.

The flowchart 300 continues with module 312 with the VPG 130 generating of presentation data responsive to determinations made in module 306. The presentation data may be representative of a first vertical path profile indicative of the plurality of first segments, where the first vertical path is visually presentable to a viewer. Additionally, the presentation data may be further representative of an aural advisory and/or a tactile advisory.

If optional module 308 is included, the presentation data may be further representative of a second vertical path profile indicative of the plurality of second segments, where the first second path is visually presentable to a viewer. If optional module 310 is included, the presentation data may be further representative of one or more visual advisories responsive to the determination of whether the first vertical path has been subjected to a limitation (as shown in FIGS. 4C-4F). Additionally, the presentation data may be further representative of an aural advisory and/or a tactile advisory responsive to the determination of the existence of first vertical path limitation(s).

The flowchart continues with an optional module 314 with the providing of the presentation data to the presentation system 140. The presentation system 140 could be configured to receive the presentation data and present the first and/or second vertical path profiles on a display unit. In some embodiments, the first vertical profile may be presented together with the second vertical profile and presented with horizontal and vertical axes. The horizontal axis could be indicative of a distance-based or time-based scale, and the vertical axis could be indicative of a vertical distance scale. In some embodiments, the presentation system could be comprised of an aural advisory unit and/or a tactile advisory unit. When the presentation data represents an aural advisory and/or a tactile advisory, one or both advisories may be presented via the aural advisory unit and/or the tactile advisory unit. Then, the method of flowchart 300 ends.

It should be noted that the method steps described above may be embodied in computer-readable media stored in a non-transitory computer-readable medium as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all modifications, permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations, enhancements, equivalents, and improvements falling within the true spirit and scope of the present invention.

What is claimed is:

1. A system for generating a vertical path profile presentable to a viewer, said system comprising:
a source of navigation data;
a source of performance factors data; and
a vertical path generator configured to:
receive navigation data representative of takeoff runway information;
receive performance factors data representative of aircraft performance factors;
determine a first vertical path as a function of first design criteria to which the takeoff runway information and the aircraft performance factors are applied, where
the first vertical path is comprised of a plurality of first segments, and
the first design criteria is comprised of a plurality of attainable climb gradients;
determine a second vertical path as a function of second design criteria to which the takeoff runway information and the aircraft performance factors are applied, where
the second vertical path is comprised of a plurality of second segments, and
the second design criteria is comprised of a plurality of predefined, minimum climb gradients; and
generate presentation data
responsive to the determinations of the first vertical path and the second vertical path, and
representative of at least a first vertical path profile indicative of the plurality of first segments and a second vertical path profile indicative of the plurality of second segments, such that
the first vertical path profile and the second vertical path profile are presentable to a viewer together with a horizontal axis and a vertical axis, where
the horizontal axis is indicative of a time-based or distance-based scale, and
the vertical axis is indicative of a vertical distance scale.

2. The system of claim 1, wherein the source of navigation data, the source of performance factors data, or both are comprised of a flight management system.

3. The system of claim 1, wherein the source of navigation data or the source of performance factors data is comprised of the vertical path generator.

4. The system of claim 1, wherein
the first design criteria and the second design criteria are further comprised of
a plurality of designated speeds,
a plurality of designated vertical distances, and
a predefined, inoperative engine configuration.

5. The system of claim 1, wherein
the first vertical path profile and the second vertical path profile are comprised of
a first takeoff path profile, and
a second takeoff path profile, respectively.

6. The system of claim 1, wherein
the vertical path generator is further configured to:
compare at least one first segment with at least one second segment to determine whether the first vertical path is subjected to limitation, such that
the generation of the presentation data is further responsive to the determination of whether the first vertical path is subjected to a limitation, and
the presentation data is further representative of at least one visual advisory responsive to the determination of whether the first vertical path is subjected to a limitation, such that
each visual advisory is presentable to the viewer.

7. The system of claim 6, wherein
the presentation data is further representative of an aural advisory presentable via an aural advisory unit, a tactile advisory presentable via a tactile advisory unit, or both.

8. The system of claim 1, wherein
the vertical path generator is further configured to:
receive navigation data representative of at least a position of the aircraft, such that
the generation of the presentation data is further responsive to at least the position of the aircraft, and
the presentation data is further representative of ownship symbology presentable to the viewer, such that
the position of the aircraft in relation to the first vertical path is illustrated.

9. A device for generating a vertical path profile presentable to a viewer, said device comprising:
a vertical path generator configured to:
receive navigation data representative of takeoff runway information;
receive performance factors data representative of aircraft performance factors;
determine a first vertical path as a function of first design criteria to which the takeoff runway information and the aircraft performance factors are applied, where
the first vertical path is comprised of a plurality of first segments, and
the first design criteria is comprised of a plurality of attainable climb gradients;
determine a second vertical path as a function of second design criteria to which the takeoff runway information and the aircraft performance factors are applied, where
the second vertical path is comprised of a plurality of second segments, and
the second design criteria is comprised of a plurality of predefined, minimum climb gradients; and
generate presentation data
responsive to the determinations of the first vertical path and the second vertical path, and
representative of at least a first vertical path profile indicative of the plurality of first segments and a second vertical path profile indicative of the plurality of second segments, such that
the first vertical path profile and the second vertical path profile are presentable to a viewer together with a horizontal axis and a vertical axis, where
the horizontal axis is indicative of a time-based or distance-based scale, and
the vertical axis is indicative of a vertical distance scale.

10. The device of claim 9, wherein
the vertical path generator is further configured to:
compare at least one first segment with at least one second segment to determine whether the first vertical path is subjected to limitation, such that
the generation of the presentation data is further responsive to the determination of whether the first vertical path is subjected to a limitation, and
the presentation data is further representative of at least one visual advisory responsive to the determination of whether the first vertical path is subjected to a limitation, such that
each visual advisory is presentable to the viewer.

11. The device of claim 10, wherein
the presentation data is further representative of an aural advisory presentable via an aural advisory unit, a tactile advisory presentable via a tactile advisory unit, or both.

12. The device of claim 9, wherein
the vertical path generator is further configured to:
receive navigation data representative of at least a position of the aircraft, such that
the generation of the presentation data is further responsive to at least the position of the aircraft, and
the presentation data is further representative of ownship symbology presentable to the viewer, such that
the position of the aircraft in relation to the first vertical path is illustrated.

13. A method for generating a vertical path profile presentable to a viewer, said method comprising:
receiving navigation data representative of takeoff runway information from a source of navigation data;
receiving performance factors data representative of aircraft performance factors from a source of performance factors data;
determining a first vertical path as a function of first design criteria to which the takeoff runway information and the aircraft performance factors are applied, where
the first vertical path is comprised of a plurality of first segments, and
the first design criteria is comprised of a plurality of attainable climb gradients;
determining a second vertical path as a function of second design criteria to which the takeoff runway information and the aircraft performance factors are applied, where
the second vertical path is comprised of a plurality of second segments, and
the second design criteria is comprised of a plurality of predefined, minimum climb gradients; and generating presentation data
- responsive to the determinations of the first vertical path and the second vertical path, and
- representative of at least a first vertical path profile indicative of the plurality of first segments and a second vertical path profile indicative of the plurality of second segments, such that
  - the first vertical path profile and the second vertical path profile are presentable to a viewer together with a horizontal axis and a vertical axis, where
    - the horizontal axis is indicative of a time-based or distance-based scale, and
    - the vertical axis is indicative of a vertical distance scale.

14. The method of claim 13, further comprising:

comparing at least one first segment with at least one second segment to determine whether the first vertical path is subjected to a limitation, such that
- the generation of the presentation data is further responsive to the determination of whether the first vertical path is subjected to limitation, and
- the presentation data is further representative of at least one visual advisory responsive to the determination of whether the first vertical path is subjected to a limitation, such that
  - each visual advisory is presentable to the viewer.

15. The method of claim 14, wherein the presentation data is further representative of an aural advisory presentable via an aural advisory unit, a tactile advisory presentable via a tactile advisory unit, or both.

16. The method of claim 13, further comprising:

receiving navigation data representative of at least a position of the aircraft, such that
- the generation of the presentation data is further responsive to at least the position of the aircraft, and
- the presentation data is further representative of ownship symbology presentable to the viewer, such that
  - the position of the aircraft is illustrated to the first vertical path in relation.

\* \* \* \* \*